J. R. MOFFATT.
DEPRESSIBLE TRIMMER BLADE AND STRIP DEFLECTOR.
APPLICATION FILED SEPT. 10, 1914.
1,247,134.
Patented Nov. 20, 1917.
5 SHEETS—SHEET 4.
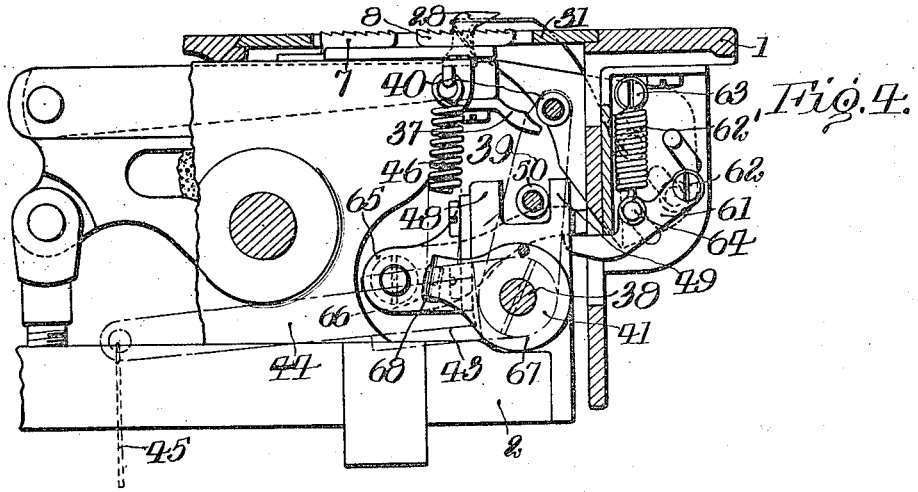
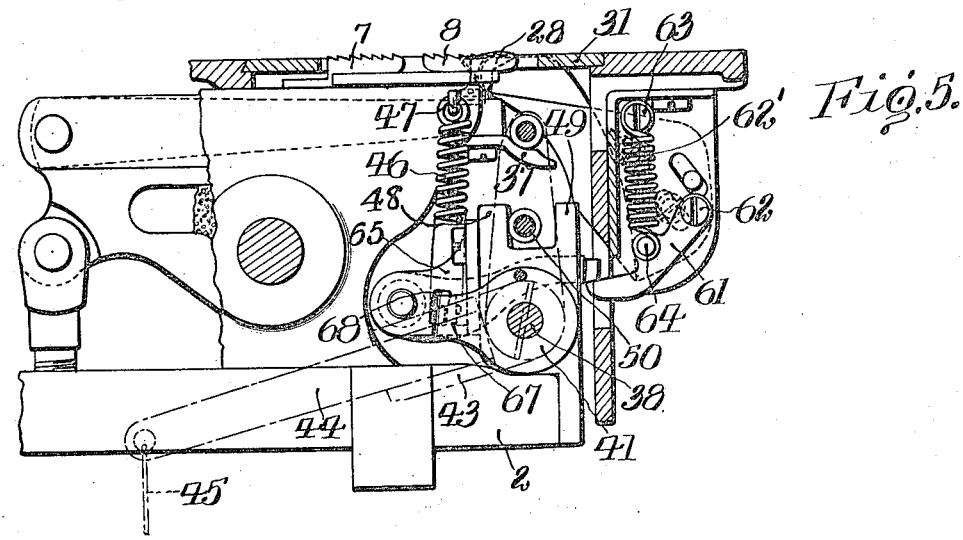
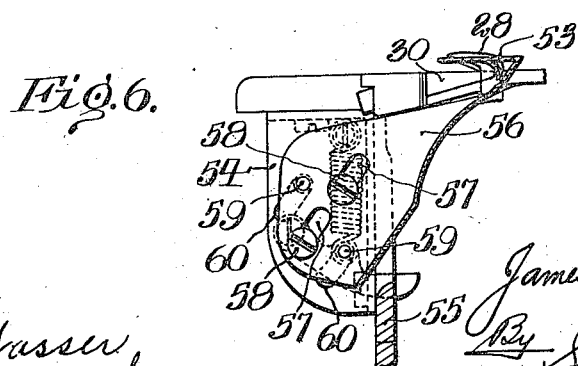

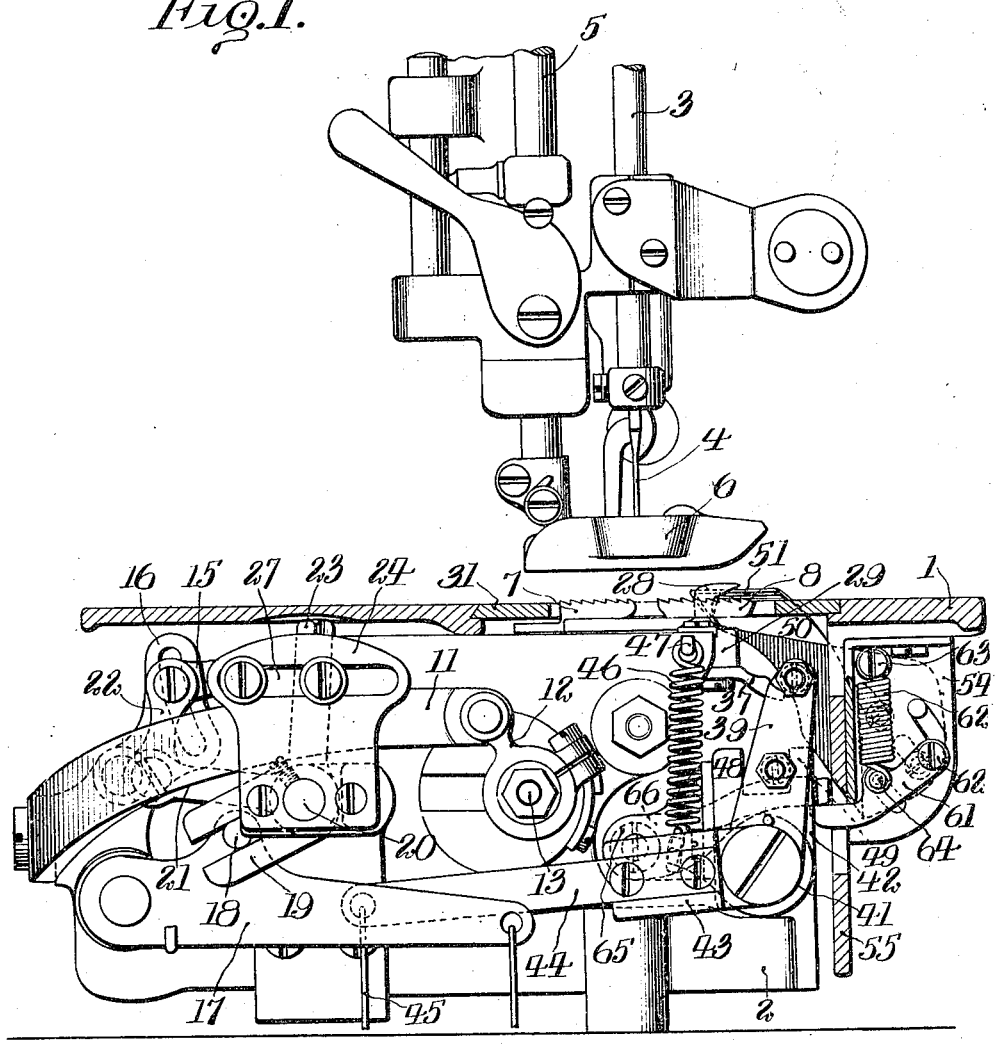

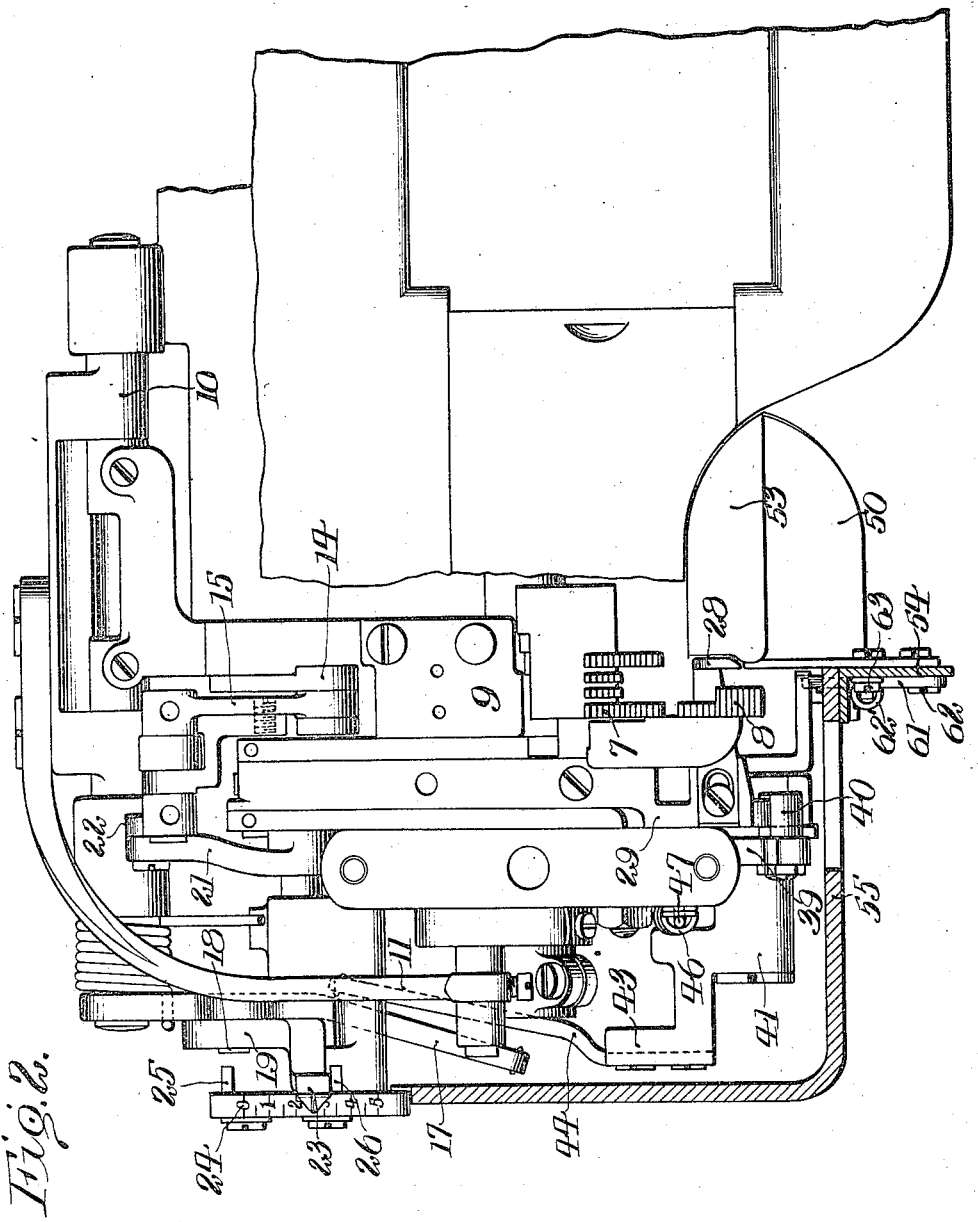

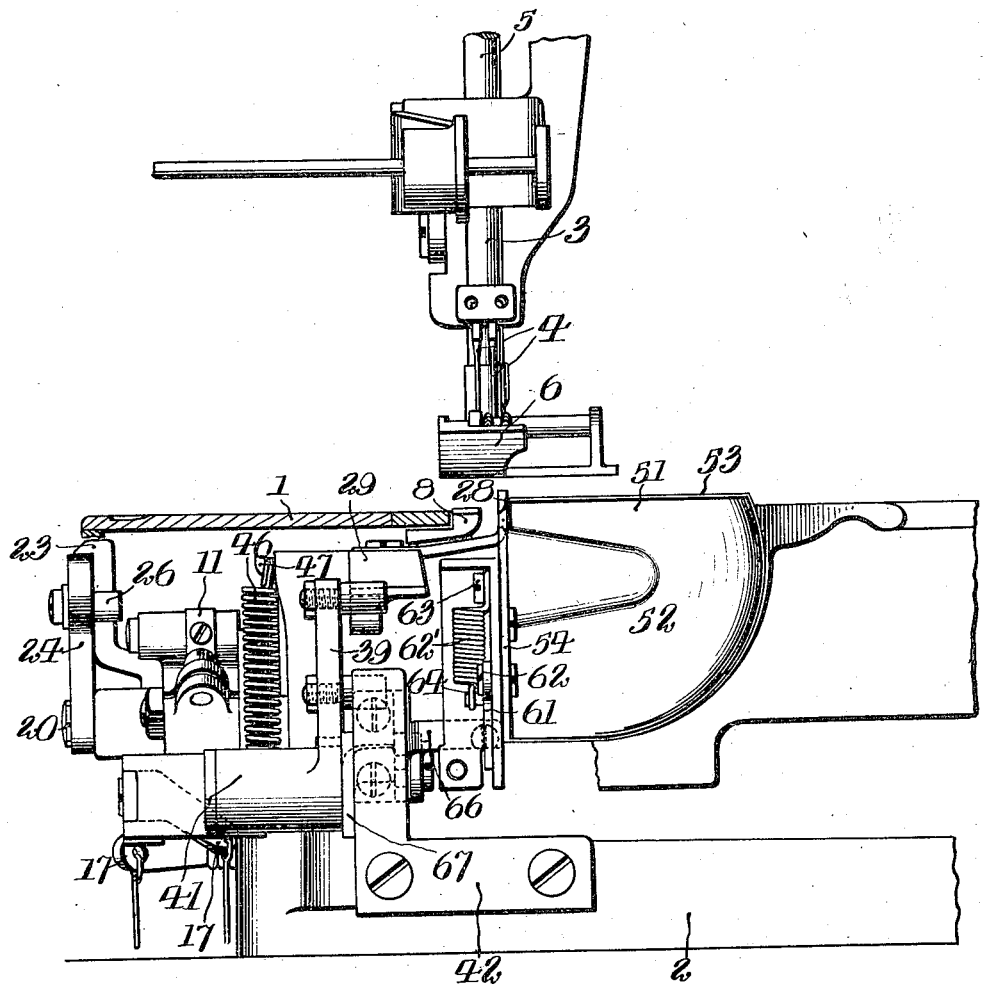

J. R. MOFFATT.
DEPRESSIBLE TRIMMER BLADE AND STRIP DEFLECTOR.
APPLICATION FILED SEPT. 10, 1914.
1,247,134.
Patented Nov. 20, 1917.
5 SHEETS—SHEET 5.
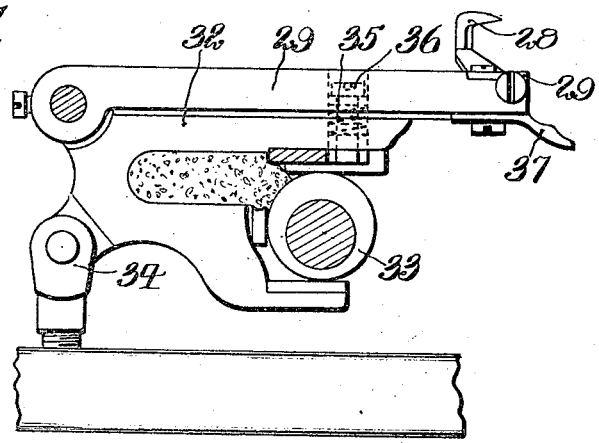
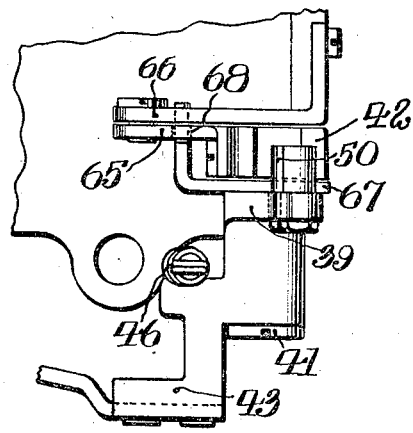
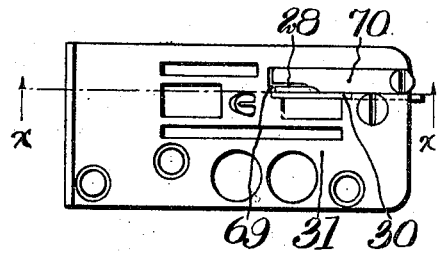
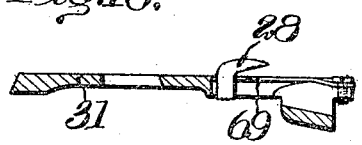
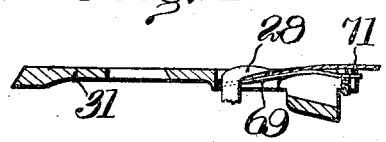
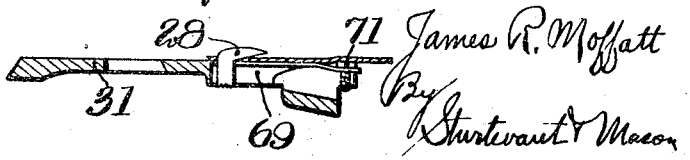
Witnesses
M. S. Vasser
Grace P. Brereton
Inventor
James R. Moffatt
By
Sturtevant & Mason
Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

DEPRESSIBLE TRIMMER-BLADE AND STRIP-DEFLECTOR.

1,247,134.	Specification of Letters Patent.	Patented Nov. 20, 1917.

Application filed September 10, 1914. Serial No. 861,110.

*To all whom it may concern:*

Be it known that I, JAMES R. MOFFATT, a citizen of the United States, residing at Chicago, in the county of Cook, State of Illinois, have invented certain new and useful Improvements in Depressible Trimmer-Blades and Strip-Deflectors, of which the following is a description, reference being had to the accompanying drawing and to the figures of reference marked thereon.

The invention relates to new and useful improvements in sewing machines and more particularly to the trimming mechanism which is used in advance of the stitching mechanism for trimming the fabric and preparing the same for stitching.

In devices of the above character, it is often desirable to render the trimming mechanism ineffective and to move the trimming blade from trimming position so as to give a free unobstructed space for handling the material. It is also desirable in connection with the trimming mechanism to provide some means for deflecting the trimmed off strip, and this deflector usually projects above the work support to a certain extent and forms an objectionable obstruction when the trimmer is depressed to ineffective position.

An object of the present invention is to provide means whereby the deflector may also be depressed to a position wholly beneath the surface of the work support.

A further object of the invention is to provide a depressing means for the deflector wherein the deflector is simultaneously shifted with the shifting of the trimming member.

A still further object of the invention is to provide means which may be operated at the will of the operator without stopping the stitching mechanism for simultaneously depressing the trimming member and the deflector, and for simultaneously restoring said trimming member and deflector to normal operative position.

A still further object of the invention is to provide a yielding member which coöperates with a trimmer blade overhanging the work support for deflecting or guiding the trimmed off strip.

These and other objects will in part be obvious and will in part be hereinafter more fully disclosed.

In the drawings:

Figure 1 is a transverse section substantially on the line of feed with certain parts in side elevation showing a sewing machine embodying my invention.

Fig. 2 is a view partly in top plan and partly in horizontal section, of the parts beneath the work support.

Fig. 3 is a longitudinal section through the work support with the parts of the trimming mechanism beneath the work support in front elevation.

Fig. 4 is a detail partly in vertical section and partly in side elevation showing the trimmer and deflector in normal operative position.

Fig. 5 is a similar view showing the parts lowered to ineffective position.

Fig. 6 is a detail partly in section showing the manner of supporting and guiding the deflector.

Fig. 7 is a side view of the supporting devices for the movable trimmer blade.

Fig. 8 is a detail view of the mechanism for shifting the strip deflector and trimmer.

Fig. 9 is a plan view of the throat plate and the trimmer showing a yielding deflector coöperating therewith.

Fig. 10 is a sectional view on the line x—x of Fig. 9.

Fig. 11 is a view showing the trimmer in its lower position and the deflector depressed thereby.

Fig. 12 is a similar view showing the trimmer and deflector in raised position.

The invention consists, generally, in providing a sewing machine which has a suitable stitch forming mechanism with a trimming mechanism which includes a trimmer blade located in advance of the stitching mechanism so as to trim and prepare the edge of the material for stitching. The trimmer blade of this trimming mechanism is so constructed that it may be moved to ineffective position and leave the upper face of the work support free from obstruction so far as the trimming mechanism is concerned.

Coöperating with this trimmer blade is a strip deflector. This strip deflector, as is usual in this type of machine, normally projects above the plane of the work support so that the trimmed off strip is deflected away from the stitching mechanism. Devices are provided whereby this deflector may be lowered when the trimmer blade is moved to ineffective position, and the deflector in its lowermost position is beneath the plane of the work support so as not to obstruct in any way the free passage of the material to the stitching mechanism.

One purpose of the above invention is to produce a machine which is adapted for stitching closed or circular articles, as for example the trimming of an arm hole for a garment and stitching an insertion therein. When the trimmer reaches a point near the beginning of the stitching, the operator may quickly depress the trimmer blade and the deflector, thus rendering the trimming mechanism ineffective and thus moving both the trimmer blade and the deflector out of the way of the operator so that the end of the line of stitching may be joined on to the beginning of the line of stitching and the operation completed.

Referring more in detail to the drawings, I have shown the invention as applied to a sewing machine of the ordinary type which consists of a work support 1 carried by a bed plate 2. This bed plate carries an overhanging arm in which reciprocates a needle bar 3 having needles 4. Also mounted on the overhanging arm is a presser bar 5 carrying a presser foot 6. The material is fed to the stitching mechanism by a feeding mechanism which as herein shown consists of a main feed dog 7 and an auxiliary feed dog 8. The main feed dog 7 is carried by a feed bar 9 which is pivotally connected to a feed rocker 10. The feed rocker 10 is provided with an arm 11 which is connected by a link 12 with a crank pin 13 on the forward end of the main shaft. The feed bar 9 is raised and lowered by a suitable eccentric on the main shaft. Mounted on the main feed bar is an auxiliary feed bar which carries the auxiliary feed dog 8. This auxiliary feed bar is provided with a lug 14 to which is pivoted a link 15, and this link 15 is in turn pivoted to a slotted arm 16 carried by the feed rocker 10. The link 15 is adjustable in this slot. This adjustment is accomplished by means of a lever 17 which is connected to a suitable treadle or knee shift. Said lever 17 carries a pin 18 engaging a forked arm 19 fixed to a rock shaft 20. The rock shaft has a projecting arm 21 which is connected by a link 22 to the movable pivot of the link 15. By moving the lever 17, the rock shaft 20 is oscillated and this in turn shifts the position of the pivotal connection of the link 15 in the slot in the arm 16.

The rock shaft 20 carries an indicating arm 23 which moves along side of a bracket 24 which may be graduated, as shown in Fig. 2. This bracket also carries stops 25 and 26 which limit the throw of the arm 23 and in turn limit the throw of the lever 17. These stops are mounted for adjustment in a slot 27 in said bracket 24. By the above mechanism, the stroke of the auxiliary feed bar may be varied so that the same feeds the material slightly faster than the main feed dog to prevent stretching when stitching an elastic fabric, or may be varied so as to gather the material in advance of the stitching mechanism, if desired.

The trimming mechanism, as herein shown, consists of a trimmer blade 28. This trimmer blade is carried by a supporting bar 29. The trimmer blade extends above the work support and overhangs the same. The trimmer blade is preferably provided with a piercing point. Coöperating with this trimmer blade 28 is a fixed trimmer blade 30. The fixed trimmer blade 30 is mounted in a supporting lug on the throat plate 31 and the upper face of this trimmer blade is flush with the upper surface of the work support.

The bar 29 is pivotally attached to a supporting bracket 32. This supporting bracket is moved up and down by an eccentric 33 on the main shaft. The bracket is pivoted at the rear end thereof to a link 34. A spring 35 is placed in a pocket in a supporting bracket and engages the under face of the supporting bar 29 for the trimmer blade. This spring normally holds the bar supporting the trimmer blade raised and a screw 36 limits the upward movement of the bar. At the forward end of the bar there is an arm 37. A rock shaft 38 carries an upwardly projecting arm 39, and this arm is provided with a roller 40. The rock shaft 38 is mounted in a suitable bearing 41 carried by a bracket 42 attached to the bed plate 2. Said rock shaft carries a projecting part 43 in which is mounted an arm 44, and the arm 44 is adapted to be connected by a suitable connection 45 to a treadle or knee shift through which the arm 44 may be depressed. A spring 46 is attached at 47 to a lug carried by the bracket mounted on the bed plate. The other end of the spring is connected to a lug mounted on the projecting part 43. This spring normally holds the arm 44 raised.

When the arm 44 is raised, the roller 40 is positioned as shown in Fig. 4. Whenever the arm 44 is depressed, then the roller 40 engages the arm 37 and depresses the supporting bar 29 which supports the trimmer blade 28. When the trimmer supporting bar is depressed, the trimmer blade is lowered so that the piercing point is substantially beneath the plane of the work support, and the stroke of the trimmer blade is entirely beneath the work support so that the trimming mechanism is ineffective to cut the material. When the trimmer blade is lowered to this ineffective position, it is removed from above the work support and thus does not, in any way, obstruct the free passage of the material through the machine.

Inasmuch as the trimmer blade has a piercing point, as shown in the drawings, it may be rendered either effective or ineffective while the fabric is passing through the machine. When rendered effective, the fabric is raised by the upward movement of the trimmer blade and the piercing point will engage the under face of the fabric, enter the same and begin its trimming action.

The throw of the lever 24 is limited by stops 48 and 49 which coöperate with a pin 50 on the arm 39. This trimming mechanism and the means for depressing the same *per se* form no part of the present invention.

The trimmer blade is located in advance of the needles 4 and is preferably used for preparing the edge for stitching, that is to say, the edge which passes between the needles is trimmed prior to the stitching thereof. In order that the trimmed off strip may be deflected away from the stitching mechanism, I have provided a strip deflector 51. This strip deflector consists of a curved portion 52 and a substantially horizontal portion 53. The strip deflector is mounted on a bracket 54 which is screwed to the under face of the work support and the depending apron 55 which is carried thereby. Said deflector is provided with a forwardly projecting portion 56 which rests flat against the side face of the bracket 54. Said projecting portion is slotted as at 57 and screws 58 extending through said slots permit said deflector to be moved downwardly on the supporting bracket 54. The projecting portion 56 also carries pins 59 which engage slots 60 that further guide the movement of the deflector.

A lever 61 is pivoted to the other face of the bracket 54 at 62. This lever is connected to one of the pins 59, and a movement of the lever will shift the position of the deflector. A spring 62' is attached at one end to the bracket 54 at 63 and at its other end to a stud 64 carried by the lever 61. This spring normally holds the deflector in raised position.

An arm 65 is attached to the bracket 42 and projects rearwardly therefrom. Pivotally connected to this arm is a lever 66. The forward end of the lever 66 engages the rear end of the lever 61. Mounted on the rock shaft 38 is an arm 67. This arm 67 is bent laterally and extends through a slot 68 in the lever 66. When the rock shaft 38 is oscillated, this arm 67 will depress the lever 66, which will in turn depress the lever 61 and this will move the strip deflector downward. Said strip deflector when in its lowermost position has its upper edge substantially flush with the plane of the work support, as shown in Fig. 5. When the lever is released, the spring 62' will raise the strip deflector.

From the above construction, it will be apparent that the operator may at will and without stopping the stitching mechanism depress the lever 44 and this will operate to move the trimmer blade so that the stroke thereof is beneath the plane of the work support and thus the trimmer blade is rendered ineffective and at the same time the strip deflector is moved downward so that the upper face thereof is beneath the plane of the work support. When, therefore, the machine is converted from a trimming and sewing machine to a plain sewing machine, both the trimmer blade and strip deflector are moved beneath the plane of the work support and thus all obstructions to the free movement of the fabric are removed.

When the operator releases the trimming mechanism, the spring 46 automatically throws the trimmer blade into normal effective cutting position and the spring 62' simultaneously and automatically throws the strip deflector to its normal effective position.

The above construction enables a trimming mechanism which is rendered effective or ineffective during the stitching operation to be provided with a strip deflector which is effective to deflect the strip during the trimming operation and which is entirely out of the way when the trimming mechanism is ineffective.

In Figs. 9 to 12, inclusive, I have shown a yielding strip guide or deflector which may be used with or independently of the strip deflector above described. In the type of trimming mechanism shown in the drawings where an overhanging trimmer blade coöperates with a fixed blade carried by the throat plate, there is necessarily a space formed through the throat plate through which the trimmer blade extends and in which it reciprocates. The throat plate 31 is provided with such a space as shown at 69. In order that this space may be substantially closed and yet not interfere with the movements of the trimmer blade 28, I have provided a yielding strip guide 70 which is formed of suitable flexible material. This strip guide is secured to the throat plate by suitable screws 71 and is located in a recess in the throat plate so that the upper face is substantially flush with the throat plate. The strip guide is provided with a portion which extends underneath the overhanging blade and a portion which extends along the side of the same. The rear end of the strip guide 70 is free to move up and down in the space 69. The material to be trimmed extends underneath the overhanging part of the trimmer blade 28. A downward movement of the blade trims the fabric and also depresses the free end of the strip guide 70, as shown in Fig. 11.

When the trimmer blade moves again to its upper position, as shown in Fig. 12, the strip guide will move upward therewith. In Figs. 11 and 12, I have indicated the strip being trimmed off which is shown at 71. This yielding strip deflector and guide supports the strip and prevents the same from passing down into the space or recess in which the trimmer blade operates, as is obvious from the above description.

It is obvious that minor changes in the details of construction and arrangement of parts may be made without departing from the spirit of the invention as set forth in the appended claims.

Having thus described my invention, what I claim as new and desire to secure by Letters Patent is:

1. The combination with a work support and stitch forming mechanism, of a trimming mechanism including a trimmer blade, means for operating said trimmer blade, means for moving the trimmer blade from cutting position, a normally stationary deflector for the trimmed off strip supported independently of the trimmer blade, and means for moving the deflector to a position flush with the upper surface of the work support when said trimmer is moved from cutting position.

2. The combination with a work support and stitch forming mechanism, of a trimming mechanism including a trimmer blade, means for operating said trimmer blade, means for moving the trimmer blade from cutting position, a normally stationary deflector for the trimmed off strip supported independently of the trimmer blade, and means controlled by the trimmer blade moving means for simultaneously moving the deflector to a position flush with the upper surface of the work support when said trimmer is moved from cutting position.

3. The combination with a work support and stitch forming mechanism, of a trimming mechanism including a trimmer blade, means for operating said trimmer blade, means for moving the trimmer blade from cutting position, a normally stationary deflector for the trimmed off strip supported independently of the trimmer blade, means for moving the deflector to a position flush with the upper surface of the work support when said trimmer is moved from cutting position, and means for automatically returning the deflector to normal operative position when the trimmer blade is returned to cutting position.

4. The combination with a work support and stitch forming mechanism, of a trimming mechanism including a trimmer blade, means for operating said trimmer blade, means for moving the trimmer blade from cutting position, means for automatically returning the trimmer blade to cutting position when released by the operator, a normally stationary deflector for the trimmed off strip supported independently of the trimmer blade, and means for moving the deflector to a position flush with the upper surface of the work support when said trimmer blade is moved from cutting position and for automatically returning the deflector to normal operative position when the cutter is released.

5. The combination with a work support and stitch forming mechanism, of a trimming mechanism including a trimmer blade, means for operating said trimmer blade, a normally stationary deflector for the trimmed off strip, and means for simultaneously moving the trimmer blade from cutting position and the deflector to a position flush with the upper surface of the work support.

6. The combination with a work support and stitch forming mechanism, of a trimming mechanism including a trimmer blade mounted beneath the work support and projecting above and overhanging the work support, means for depressing the trimmer blade so that the cutting edge thereof operates beneath the plane of the work support for rendering the same ineffective, a normally stationary deflector for the trimmed off strip supported independently of the trimmer blade, means for depressing the deflector to a position flush with the upper surface of the work support when said trimmer blade is depressed.

7. The combination with a work support and stitch forming mechanism, of a trimming mechanism including a trimmer blade mounted beneath the work support and projecting above and overhanging the work support, means for depressing the trimmer blade so that the cutting edge thereof operates beneath the plane of the work support for rendering the same ineffective, a normally stationary deflector for the trimmed off strip supported independently of the trimmer blade and means for simultaneously depressing the deflector to a position flush with the upper surface of the work support when said trimmer blade is rendered ineffective and for automatically returning the deflector to normal operative position when the trimmer blade is raised to effective position.

8. The combination with a work support and stitch forming mechanism, of a trimming mechanism including a trimmer blade mounted beneath the work support and projecting above and overhanging the work support, means for depressing the trimmer blade so that the cutting edge thereof operates beneath the plane of the work support for rendering the same ineffective, a spring for returning the trimmer blade to effective position, a normally stationary deflector for the trimmed off strip supported independently of the trimmer blade, means operated by the trimmer depressing means for moving the deflector to a position flush with the upper surface of the work support when the trimmer blade is depressed, and a spring for automatically returning the deflector to normal operative position when the trimmer blade is returned to effective position.

9. A trimming mechanism including in combination a work support, a trimmer blade, a normally stationary deflector for the trimmed off strip, means for supporting said deflector whereby the same may be moved so as to be wholly beneath the plane of the work support, means under the control of the operator for depressing the deflector at will, and a spring for returning the deflector to normal operative position when released.

10. A trimming mechanism including in combination a work support, a trimmer blade, a deflector for the trimmed off strip, a bracket mounted on the work support, means for supporting the deflector on said bracket whereby the deflector may be moved downwardly and forwardly to a position wholly beneath the plane of the work support, and means under the control of the operator for depressing said deflector at will.

11. A trimming mechanism including in combination a work support, a trimmer blade, a deflector for the trimmed off strip, a bracket mounted on the work support, means for supporting the deflector on said bracket whereby the deflector may be moved downwardly and forwardly to a position wholly beneath the plane of the work support, means under the control of the operator for depressing said deflector at will, and a spring for raising the deflector so that the same projects above the work support for engaging and deflecting the trimmed off strip.

In testimony whereof, I affix my signature in the presence of two witnesses.

JAMES R. MOFFATT.

Witnesses:
S. GEORGE TATE,
C. McNEIL.

Copies of this patent may be obtained for five cents each, by addressing the "Commissioner of Patents, Washington, D. C."